March 3, 1959   R. M. DORLAND ET AL   2,876,153
SYNTHETIC BOARD AND METHOD OF MANUFACTURE
Filed April 1, 1955                                    4 Sheets-Sheet 1

United States Patent Office 2,876,153
Patented Mar. 3, 1959

2,876,153

SYNTHETIC BOARD AND METHOD OF MANUFACTURE

Rodger M. Dorland, Maxwell M. Yan, and Edward C. Hale, Sault Ste. Marie, Ontario, Canada, assignors to Abitibi Power & Paper Company, Limited, Iroquois Falls, Ontario, Canada, a corporation of Canada Application April 1, 1955, Serial No. 498,708

Claims priority, application Canada April 29, 1954

3 Claims. (Cl. 154—45.9)

This invention relates to synthetic lumber and more particularly to a synthetic lumber made from platelets, which is a term used to designate thin, flat unbroken shavings of wood.

Synthetic lumber has been used as a general designation for artificial wood boards in the 0.5–0.85 specific gravity range, made by the heat and pressure consolidation of comminuted wood coated with binder. Synthetic lumber has previously been made from shavings, splinters, chips, sawdust and platelets. Of these, platelets produce one of the most promising boards but the full development of platelet board has been retarded by the difficulty of obtaining smooth surfaces and of eliminating discontinuities and voids in the board structure. The expedients which have been attempted such as mixing the platelets with a fine filler such as sawdust are not satisfactory as the board produced lacks uniformity and does not take full advantage of the potential superiority of the properties of platelet board. Furthermore, it is difficult to obtain even a reasonably homogeneous mixture of the platelets and fine filler. The surface can be improved by use of additional resin acting as filler or of additional moisture which makes the platelets more pliable and so permits greater void reduction. However, both methods are costly since binder expense and press cycle are increased.

The object of this invention is to provide a platelet board which fully develops the potential advantages of platelets to give a board with good flat to flat gluing, excellent consolidation, minimum voids, high strength, good moisture resistance, good nailability, excellent workability in any direction and superior ease of finishing.

In accordance with this invention a board is formed from platelets each edge of which is tapered or feathered. The platelets are adhered together by means of an adhesive binder.

In the drawings which illustrate this invention:

Figure 2:
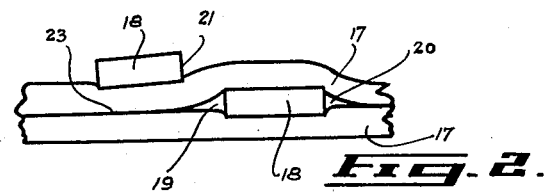
Figure 2 is a compartive sketch to Figure 1 showing the formation of a board where platelets with square edges are used.
Figure 1:
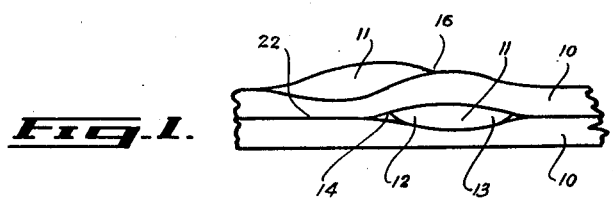
Figure 1 is a sketch showing a sectional view of the formation of a board made from platelets all edges of which are tapered.

Referring now to Figures 1 and 2, in Figure 1 a board is shown formed from platelets 10 lying with their longitudinal dimensions in one direction and platelets 11 with their longitudinal dimension lying in a direction transverse to said one direction. The platelets are shown with their thickness exaggerated to illustrate the points discussed below. Each edge of these platelets is tapered, but only the tapered side edges 12 and 13 of platelets 11 are shown in Figure 1. It will be noted that the bridge voids 14 and 15 at the side edges of platelets 11 are of small size, and that there is a smooth surface at junction 16.

As a comparison to the formation shown in Figure 1, Figure 2 may be considered which shows platelets 17, which do not have tapered edges or which only have their end edges tapered, disposed transversely to platelets 18 which have square cut side edges and which may or may not have feathered ends. In Figure 2 there are bridge voids 19 and 20 of substantial size at each side of the platelets 18 in the interior of the board and surface discontinuities 21 where a platelet 18 is at the surface of the board. The voids 19 and 20 give weak points in the board which act as points of concentration of stresses when the board is stressed thus detracting from the strength of the board. The surface discontinuities detract from both the appearance and strength of the board and both the surface discontinuities and the voids tend to facilitate the entrance of moisture into the interior of the board and its retention there.

The mating surfaces of the platelets in the boards in Figures 1 and 2 are adhered together by resin coatings 22 and 23 respectively.

For a practical forming process it is necessary that a random orientation of the platelets be used, as it would be impractical to provide exact control of the orientation of each platelet. The platelets 10 and 11 in Figure 1, and 17 and 18 in Figure 2, are intended to represent typical platelets which have been deposited by a random orientation forming method and which happen to fall transversely to each other. It will be appreciated, however, that some of the platelets will be deposited parallel to or at various different angles to the platelets above and below. In each case the same principles apply, and the use of platelets, each of the edges of which are tapered, will decrease the occurrence of internal and surface bridge voids.

Another consequence of using tapered platelets will be apparent from Figures 1 and 2, namely, there will not be sharp discontinuities in the extent to which portions of each platetlet are compressed. When the platelets which have been formed by random orientation are compressed in the press, intersecting platelets will become embedded in each other with the consequence that portions of each platelet will be more highly compressed than other portions of the same platelet. It will be apparent from Figures 1 and 2 that where the platelets have square cut side edges there will be sharp discontinuities in the extent to which adjacent platelets are compressed which will weaken and damage the platelets, whereas with tapered side edges these abrupt and discontinuous changes in the compression of the platelets will not occur.

A further advantage of the use of platelets with tapered side edges is that during the compression of the randomly oriented platelets in the press the taper will assist the platelets to work themselves into positions with respect to adjacent platelets in which voids and local compression are minimized. Square cut platelets will have a tendency to become embedded in each other instead of flowing under compression. Tapered platelets will, in effect, present slidable wedge surfaces which will facilitate the self-adjustment of the platelets into positions in which voids and local compression are at a minimum.

While the platelets should be tapered both at the side and end edges, the tapering of the side edges is considered to be of paramount importance, as the side edges represent about 80% of the perimeter of each platelet and the end edges about 20%.

The avoidance of local compression by the use of tapered platelets increases the homogeneity and strength of the board and also enhances the properties of the board when exposed to moisture. Where local compression is present the locally compressed areas will swell under moisture to a greater extent than the areas where there is less compression.

The tapering of side edges of the platelets enables a compromise to be achieved between the properties of thin shavings or platelets and thicker platelets. Thin platelets have the advantages of less local compression, fewer voids and, in general, greater homogeneity but have the disadvantages of having less strength, requiring more cutting, requiring more binder due to the increased surface area, being difficult to cut without producing curled platelets and being difficult to handle during forming due to their lightness, bulk and liability to damage. The tapered edge platelets proposed in accordance with this invention, in effect, provide the advantages without the disadvantages of a thin platelet.

Figure 3:
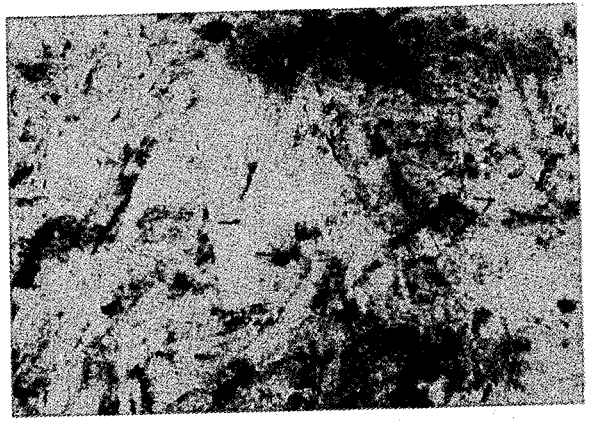
Figure 3 is a photograph of the sanded surface of a tapered white pine platelet panel.
Figure 4:
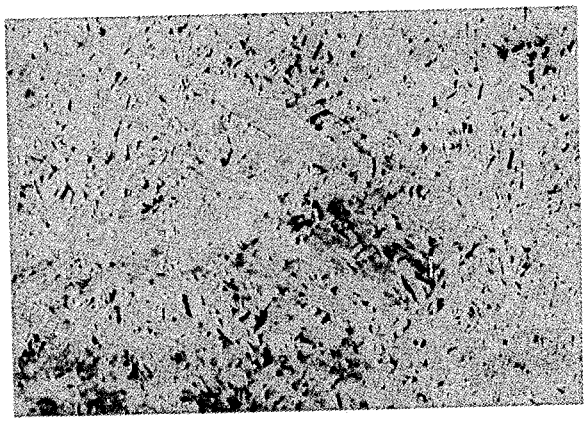
Figure 4 is a photograph of the sanded surface of a squared-edged white pine plated panel.
Figure 5:
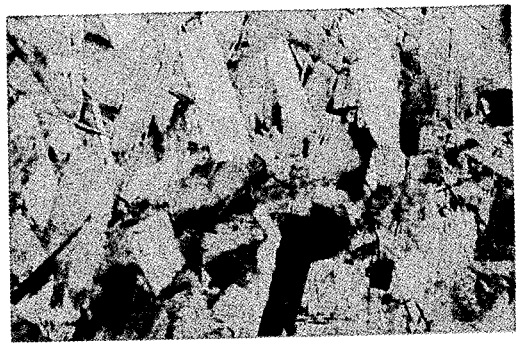
Figure 5 shows a tapered edge platelet board surface before sanding.
Figure 6:
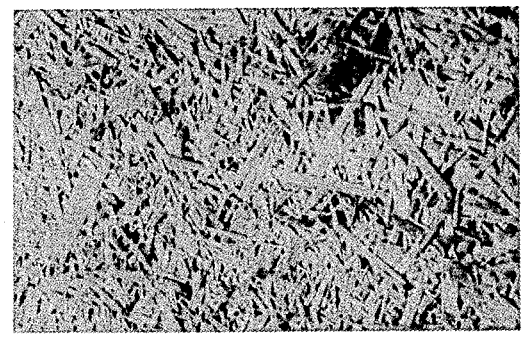
Figure 6 shows a square-edged platelet board surface before sanding.
Figure 7:
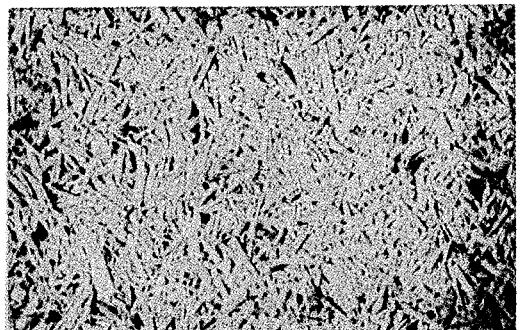
Figure 7 shows a splinter board surface.
Figure 8:
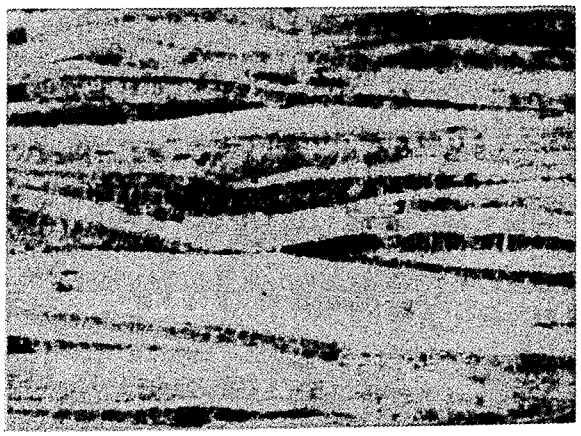
Figure 8 is an edge section photograph of a tapered edge platlet board.
Figure 9:
Figure 9 is an edge section photograph of a splinter board.

The practical effects of tapering each of the edges of the platelets will be apparent from Figures 3 to 9 which show comparative photographs of platelet board formed from platelets with tapered side edges, platelet board made with square-edged platelets and splinter board. Figure 3 is a photograph of the sanded surface of a tapered white pine platelet panel. Figure 4 is a photograph similar to Figure 3 but showing the sanded surface of a square-edged white pine platelet panel. Figure 5 shows the surface of a board made from platelets with a tapered edge. Figure 6 shows the surface of a board made from square-edged platelets with no taper. Figure 7 shows the surface of a splinter board. It will be evident that the splinter board is inferior to platelet board due to the inferior consolidation characteristics and the irregular and thick shape of the splinter. Figure 8 is an edge section photograph magnified twelve times of a board made from tapered edge platelets. Figure 9 is an edge section photograph magnified twelve times of a board made from splinters.

It will be apparent from a consideration of Figures 3 to 9 inclusive that both the surface and the internal structure of a board made from platelets each edge of which is tapered are substantially free from voids and discontinuities. It is particularly evident in Figures 3 and 4 that sanding of the surface will not overcome the surface irregularities imparted by square-edged platelets, as the voids are exposed afresh as successive layers are removed.

The platelets can be made from either softwoods or hardwoods, but low density woods such as softwoods and poplar are the preferred species for the highest quality end product in the 0.6 specific gravity range. While up to about 5% bark can be used without much detrimental effect it is preferred for a high quality product that the bark be removed prior to the wood processing. Recommended moisture ranges for the wood being processed are 30 to 60% depending on species and cutting machine.

The platelets should be thin, tapered on all sides, particularly the longitudinal sides, and of a flat, non-curly nature to give most effective surface to surface contact and a minimum of voids. They should have uniform well controlled shapes and undamaged botanic structure for the best results. It is also important that the platelets should have free flowing characteristics and good processing qualities. The platelets should not be so fragile as to render handling a problem in maintaining uniformity.

Figure 10:
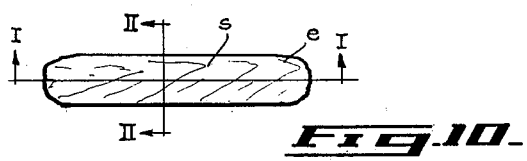
Figure 10 is a plan view of an individual platelet.
Figure 11:
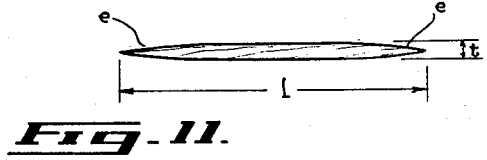
Figure 11 is a sectional view of the line I—I of Figure 10.
Figure 12:
Figure 12 is a sectional view on the line II—II of Figure 10.

The dimensions of the individual platelets will be considered with reference to Figures 10, 11 and 12. Figure 10 shows a plan view of a platelet, Figure 11 a sectional view on the line I—I of Figure 10 and Figure 12 a sectional view on the line II—II of Figure 10.

The thickness or calliper $t$ of the platelets has been found to be an important factor in the production of a board of high strength and good appearance. Thinner shavings have high flexibility and give best consolidation. The tapered form of platelet retains these advantages with the added advantage that the thick central portion of the tapered platelet acts as a reinforcing rib, reducing fragility and, in effect, permitting the practical use of a thinner average shaving. A thickness of between about 0.004" and 0.012" give best results but for practical commercial purposes a thickness of 0.004" to 0.020" gives a board with good properties. The length $l$ of the platelet is not too critical and lengths of about ¼" to 3 inches can be used. If too long a platelet is used there will be a loss of flowing characteristics which will make forming difficulties and there is a tendency for gap bridging and clumping to increase. A length of ¾" to 1½" is preferred and for some woods such as birch the length should not exceed one inch. The width $w$ should be about 0.04–0.4 inch and should be as uniform as possible. If the width is increased greater life and character will be imparted to the appearance of the board but uniformity will be difficult to maintain. As will be apparent from Figures 10, 11 and 12 the grain preferably runs parallel to the length $l$ of the platelets. As is shown in Figures 10, 11 and 12 both the end edges $e$ and the side edges $s$ of the platelet are tapered in accordance with this invention.

The mat bulk of the platelets varies from 0.02 to 0.07 specific gravity depending on the character of the platelet and the wood species. It is preferable to keep the mat bulk at as high a specific gravity as possible to reduce the daylight opening required in the hot press and to facilitate handling. A major cause of low specific gravity is an excess of loosely attached hairs and fine, curly or fork-splintered particles.

The preferred method of cutting the platelets involves the use of a rotary cutting head having a plurality of sets of knives. A suitable cutting head has 24 knives set in 8 rows of three 1-inch wide knives. The knives are tangential to the log surface at the start of the cut and the log is rotated in the same direction as the cutting head. Alternate rows of knives are staggered and overlapped about ⅛ inch and this results in a feathering of the end edges of the platelets. The side edges are tapered due to the arc of cut.

Moisture control in the platelet mats is important as insufficiently moist platelets are difficult to compress and result in slow heat transfer during pressing while excessive moisture in either the platelets or glue film gives rise to long press times, poor bonding or steam entrapment. The optimum range for platelets has been determined as about 12½ to 14%. A mat moisture of 12½ to 14% corresponds to a platelet moisture content of 3 to 10% with a 9% binder and size addition at a concentration of 45 to 60%.

It has been found that a substantial improvement in the properties of the platelets and of the board produced with the platelets can be obtained by burnishing the platelets. This results in the removal of loosely attached hair from the surface of the platelets. During or after the drying process, but preferably while the platelets are wet, the platelets should be moved against each other or the walls of the container to cause gentle abrasion of the surface and hence remove loosely attached hairs and hangnail-like fragments, thus polishing or burnishing the surface. Such action can be produced by rotary driers such as a kiln drier or to a lesser degree, by vertical driers such as a Turbo-Drier. Special vessels with abrasive-coated walls over which the platelets are passed many times can also be used. The effect of burnishing is more important for certain species such as white pine and less so for others such as poplar. Table I shows the effect of burnishing on platelet quality.

Table I

| Species | Drying Method | Character of Platelet Surface | Bulk, Cu. in./lb. | MOR, p.s.i. (corrected to 0.6 Sp. Gr.) |
|---|---|---|---|---|
| White pine | Flat screen, no platelet movement. | Loosely attached fibres. | 503 | 2,800 |
| Do | Flat screen followed by 15 hr. rotary burnish. | Clean, smooth surface. | 324 | 3,550 |
| Do | Rotary drum drier. | Clean surface | 480 | 3,650 |

Figure 13:
Figure 13 is a photograph of the surface of a platelet dried without movement, on a screen.
Figure 14:
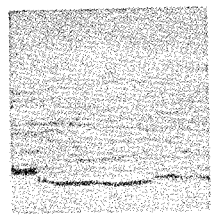
Figure 14 is a photograph of the surface of a platelet dried with movement, in a revolving drum.

The effect of burnishing is further illustrated by Figures 13 and 14. Figure 13 shows a photograph, magnified 5 times, of a surface of a platelet dried without movement on a screen, having loosely attached hair. Figure 14 shows a photograph magnified 5 times of a rotary drum dried platelet surface showing good removal of loosely attached hair.

Where the platelets are cut with the grain less burnishing is required than where the platelets are cut across the grain.

Burnishing during drying has the additional advantage of reducing clumping tendencies since there are fewer points where the individual platelets can catch and interlock. This makes for easier handling and better formation.

Another factor which should be considered during the drying stage is the removal of dust associated with the platelets. The removal of the dust will increase the homogeneity and strength of the product and will also result in a saving of costly resin. A wind sifter can be used to remove this dust. While dust should normally be removed, it has, however, been found to be of some advantage with respect to water resistance to retain the fine shavings produced when the platelets are cut as these act to fill up the voids.

The binder can be selected from a wide variety of binders, the preferred binders being urea formaldehyde and phenol formaldehyde resins. Other types of binders include melamine formaldehyde, resorcinol formaldehyde, spent sulphite liquor and lignin binders, silicates and animal blood. A suitable urea formaldehyde resin is known under the trade name Lauxite UF 106. A suitable catalyst is an ammoniacal solution of an acid salt known under the trade name Catalyst AM. A suitable proportion of binder is from 2 to 12% and preferably about 7% of the total bone dry board weight for 0.6 sp. gr. boards. Lesser quantities are used for higher gravities and greater amounts for special surfaces. About 2% of a wax size such as the material known under the trade name Paracol 600 N should also be used. If desired, other materials can be added to the board such as extenders for the resin, fire retardant materials, anti-mold and bacteria agents, wood preservatives and dyes.

The preferred method of applying the binder is by spraying, but other methods such as dry mixing with powdered chemicals, roller coating and impregnation can be used. Preferably an air-atomizing spraying device which sprays the binder as a fine fog is used. The platelets can conveniently be sprayed in an internal type mixer the mixing blades of which should be sufficiently spaced from the walls to avoid breaking and crushing of the platelets.

It is desirable that the binder stay on the surface of the platelets since that binder which soaks into the platelet does not act as adhesive and is waste. The greater the viscosity of the binder, the less will it penetrate into the platelet. It is therefore desirable to spray at the highest possible viscosity. However, the higher the viscosity, the harder it is to disperse the binder into the fine droplets required for best coverage. These contradictory demands can be satisfied by heating the viscous binder, thus reducing its viscosity, just before the point of dispersion into fine droplets. Immediately after they are formed, the droplets are cooled down by the atomizing air so they are again viscous when they hit the platelets. This technique can be used both for liquid resins and for the dispersion in molten form of waxes which are normally solid at room temperature, thus avoiding the expense of emulsification and the unnecessary introduction of water. The temperature to which the binder is heated will vary according to the equipment used and the viscosity of the binder. As an example, a urea formaldehyde resin binder could be heated to 120° F. The platelets should be sprayed from a distance which is sufficient to permit the droplets of binder at least partially to cool, for example a distance of one foot.

The coated platelets should be so formed that their surfaces are all parallel to each other, thereby giving maximum bonding. The shape of the platelets is an advantage in forming as the platelets have an inherent tendency to lie flat. To take advantage of this tendency distributing equipment should be provided which disperses the particles in such a manner that each platelet can fall and settle onto the mat individually. Metering equipment should be provided to give an even feed to the distributing unit. Air dispersion can be used or a mechanical disperser with cooperating spike rolls with spikes extending into the apertures of a grid mounted above the spike rolls. Further possibilities are an oscillating flat screen or an inclined vibrating chute. The metering equipment could be a series of feed screws or a feed hopper with a controlled discharge. The difficulty with feed hoppers is the tendency of the material to bridge across exit openings and a special bin feeder has been developed to overcome this. This new feeder includes a horizontal belt on which the platelets are deposited and a vertical belt including lifting cleats spaced above the horizontal belt so as to leave an opening for the material being metered. The vertical belt removes excess material from the exit opening and at the same time keeps the platelets in constant motion to prevent packing thus permitting even feed without bridging difficulties. The new feeder is more fully described in co-pending application Serial No. 484,242, filed January 26, 1955, now Patent No. 2,756,972, for an invention of Joseph Stokes et al. entitled "Metering Device."

It may be desirable to provide a composite or sandwich board in which the surface layers are resin enriched. A sandwich board may also be advantageous for the best and most economical use of various sizes of platelets. Thus it may be permissible to include more finer particles in the core structure of the board than would be acceptable in the surface layers. These types of sandwich construction can be formed by depositing the pad from successive layers from three or more separate forming machines. The use of several successive forming machines may be advantageous even if a sandwich structure is not desired to make certain that the platelets are oriented flat and parallel to the surface. The use of a single forming machine is likely to result in an angular formation particularly where a thick board is being made.

It is preferred that the formed mats first be subjected to cold prepressing. The formed pad is then consolidated under heat and pressure. The press cycle will be affected by such variables as the resin binder employed, the wood species, the density desired, the mat moisture, the moisture distribution, the board thickness and the state of the burnish. The specific gravity can be governed either by the pressure applied or by stops in the press which establish the caliper. A suitable pressure would be 250 p. s. i. initial maximum reduced slowly starting shortly before calliper is reached. With the temperature of the platens at 280° F. for a urea formaldehyde binder the press cycle would have a duration of about 10 to 11 minutes for ½ inch board, to give a board of about 0.6 sp. gr. The temperature at the centre of the board reaches above 235° F. The board coming from the press can be conditioned by hot stacking, cooling and moisture equalization. The boards can then be trimmed, cut to size and, if desired, sanded.

The physical properties of a sample board made in accordance with this invention were as shown in Table II for a ½ inch board made from white pine platelets.

Table II

| | | |
|---|---|---|
| Moisture at test | percent | 6.3 |
| Calliper | in | 0.50 |
| Sp. gr | | 0.59 |
| Weight | lb./1000 ft.² | 1535 |
| Weight increase (on immersion for 24 hrs. under one inch water at 68° F.) | percent | 18 |
| Swell (on immersion as above) | do | 6.2 |
| Warp (cupping) (10 in. sq. samples exposed on one surface to atmosphere in equilibrium with water at 140° F. for 4 hrs.) | in | 0.004 |
| Twist (on exposure as above) | in | 0.002 |
| Dry MOR (3 in. by 6 in. sample loaded centrally as simple beams with 4 in. span) | p. s. i | 4400 |
| Wet MOR (loaded as above after immersion as above) | p. s. i | 3100 |
| Compressive strength at proportional limit (load applied at 0.015 in./min. to 4 sq. in. of 2 in. x 6 in. sample) | p. s. i | 530 |
| Nail holding (6 D common 2 in. wire nails—load required for withdrawal) | lbs | 35 |
| Screw holding (#10—1½ in. wood screws with 7/64 in. lead holes) | lbs | 170 |
| Linear expansion (from 50% to 90% relative humidity at 73° F.) | percent | 0.25 |

The board produced in accordance with this invention has been found to have excellent strength and moisture resistance and has the advantage over natural lumber of non-directional properties. Modifications can be made. For example a core of platelet board can be combined with a surface of wood veneer, decorative overlay or paper in a one step consolidation operation. Special effects such as leather patterns or shadow joints could be obtained by embossing in the hot press. Another possibility would be the combination of the board with a metal facing such as sheet aluminum.

We claim:

1. A heat- and pressure-consolidated synthetic board formed from relatively long and narrow platelets having tapered side and end edges, each of said tapered edges being bevelled inwardly from each surface of the platelet, said platelets thereby having feathered edges and surfaces substantially free from discontinuities and consequently presenting slidable wedge surfaces to facilitate the self-adjustment of the platelets into position, said platelets being adhered together by a binder and the platelets being each individually burnished so as to be substantially free from surface hair prior to consolidation thereof into said board.

2. A method of making a heat- and pressure-consolidated synthetic board comprising the steps of cutting platelets having a thickness of about 0.004 to 0.020 inch, a width of about 0.04 to 0.4 inch and a length of about 0.75 to 1.5 inches, each of said platelets having tapered side and end edges bevelled inwardly from each surface of the platelet, said platelets thereby having feathered edges and surfaces substantially free from discontinuities and consequently presenting slidable wedge surfaces to facilitate the self-adjustment of the platelets into position, burnishing each of said platelets substantially completely to remove surface hair, applying a binder to the thus-burnished platelets, and consolidating the burnished binder-coated platelets under heat and pressure to produce said synthetic board.

3. A heat- and pressure-consolidated synthetic board at least one layer of which is formed from relatively long and narrow platelets having tapered side and end edges, each of said tapered edges being bevelled inwardly from each surface of the platelet, said platelets thereby having feathered edges and surfaces substantially free from discontinuities and consequently presenting slidable wedge surfaces to facilitate the self-adjustment of the platelets into position, said platelets being formed with a random orientation and with their surfaces substantially parallel to the surface of the board, said platelets having a thickness of about 0.004 to 0.020 inch, a width of about 0.04 to 0.4 inch and a length of about 0.75 to 1.5 inches, the platelets being consolidated together so that said layer will be substantially free from voids and local compression, and a binder adhesively uniting juxtaposed surfaces of said platelets, the platelets from which the board is formed being individually burnished so as to be substantially free from surface hair prior to consolidation thereof into said board.

References Cited in the file of this patent

UNITED STATES PATENTS

| | | |
|---|---|---|
| 1,067,825 | Manson | July 22, 1913 |
| 2,066,734 | Loetscher | Jan. 5, 1937 |
| 2,178,358 | Howald et al. | Oct. 31, 1939 |
| 2,392,844 | Fairchild | Jan. 15, 1946 |
| 2,452,739 | Fairchild | Nov. 2, 1948 |
| 2,642,371 | Fahrni | June 16, 1953 |
| 2,655,189 | Clark | Oct. 13, 1953 |
| 2,673,370 | Goss | Mar. 30, 1954 |
| 2,689,092 | Clark et al. | Sept. 14, 1954 |
| 2,700,796 | Roman | Feb. 1, 1955 |
| 2,773,789 | Clark | Dec. 11, 1956 |
| 2,773,790 | Clark | Dec. 11, 1956 |
| 2,798,019 | Verbestel | July 2, 1957 |

OTHER REFERENCES

"Paper Trade Journal," for February 9, 1950, article "Wood Fibers From Veneer Waste," by A. Elmendorf, pages 29–31.